US012587958B2

(12) United States Patent
Fang et al.

(10) Patent No.: US 12,587,958 B2
(45) Date of Patent: Mar. 24, 2026

(54) ELECTRIC ENERGY CONTROL METHOD AND RELATED DEVICE

(71) Applicant: HUAWEI TECHNOLOGIES CO., LTD., Guangdong (CN)

(72) Inventors: Liangren Fang, Shenzhen (CN); Lanping Gong, Shenzhen (CN); Benhua Xie, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 504 days.

(21) Appl. No.: 17/992,631

(22) Filed: Nov. 22, 2022

(65) Prior Publication Data

US 2023/0078602 A1    Mar. 16, 2023

Related U.S. Application Data

(63) Continuation of application No. PCT/CN2021/095664, filed on May 25, 2021.

(30) Foreign Application Priority Data

May 27, 2020    (CN) .......................... 202010460832.7

(51) Int. Cl.
H04W 52/02 (2009.01)
H02J 13/00 (2006.01)

(52) U.S. Cl.
CPC ... H04W 52/0206 (2013.01); H02J 13/00022 (2020.01)

(58) Field of Classification Search
CPC ... H04W 52/06; H04W 52/0206; H02J 13/00; H02J 13/00022
See application file for complete search history.

(56) References Cited

U.S. PATENT DOCUMENTS 8,058,749 B2 * 11/2011 Radun ................... H02J 7/1423
                                                                    307/64
9,351,170 B2 * 5/2016 Liu ................... H04W 52/0206
                        (Continued)

FOREIGN PATENT DOCUMENTS

CN        102868216 A      1/2013
CN        103117564 A      5/2013
                        (Continued)

OTHER PUBLICATIONS

Office Action in Chinese Appln. No. 202010460832.7, dated Nov. 16, 2022, 14 pages (with English translation).
(Continued)

*Primary Examiner* — Hai V Nguyen
(74) *Attorney, Agent, or Firm* — Fish & Richardson P.C.

(57)    ABSTRACT

This application disclose example electric energy control methods. When power of a main device is lower than baseline power, an energy storage device is in a charging state and stores remaining electric energy. When power of a main device is greater than the baseline power, the main device receives electric energy output by a power supply device and the energy storage device. To be specific, the energy storage device is in a discharging state and supplies power together with the power supply device to ensure operation of the main device. However, an amount of electric energy stored in the energy storage device is limited. When an amount of the electric energy of the energy storage device is insufficient, the main device is notified to decrease radio frequency power of a preset frequency band of the main device, to reduce a breakdown caused by excessively high power of the main device.

12 Claims, 5 Drawing Sheets

(56) References Cited

U.S. PATENT DOCUMENTS

| | | | | |
|---|---|---|---|---|
| 9,768,832 | B2 * | 9/2017 | Nishibayashi | H02J 3/32 |
| 10,348,087 | B2 * | 7/2019 | Suzuki | H02J 9/00 |
| 10,756,540 | B2 * | 8/2020 | Watanabe | H02J 13/00 |
| 10,880,362 | B2 * | 12/2020 | Paruchuri | H04L 67/1004 |
| 11,014,680 | B2 * | 5/2021 | Sun | H02M 3/33584 |
| 11,018,523 | B2 * | 5/2021 | Pavlovski | H02J 3/46 |
| 11,264,826 | B2 * | 3/2022 | Jin | H02J 3/381 |
| 12,086,007 | B2 * | 9/2024 | Huang | H02J 9/061 |
| 12,224,618 | B2 * | 2/2025 | Luo | H02J 9/061 |
| 2010/0276992 | A1 * | 11/2010 | Radun | H02J 7/345 |
| | | | | 307/9.1 |
| 2014/0070617 | A1 * | 3/2014 | Detmers | H02J 7/0071 |
| | | | | 307/64 |
| 2014/0088781 | A1 * | 3/2014 | Kearns | H02J 3/322 |
| | | | | 700/295 |
| 2014/0256330 | A1 * | 9/2014 | Liu | H04W 88/08 |
| | | | | 455/446 |
| 2015/0063473 | A1 * | 3/2015 | Nishibayashi | H02J 13/00 |
| | | | | 375/257 |
| 2015/0241896 | A1 * | 8/2015 | Nishibayashi | G05B 15/02 |
| | | | | 700/286 |
| 2015/0326015 | A1 * | 11/2015 | Steven | G06Q 10/00 |
| | | | | 700/291 |
| 2016/0233674 | A1 * | 8/2016 | Chung | H02J 3/46 |
| 2017/0047736 | A1 * | 2/2017 | Suzuki | H02J 3/00 |
| 2018/0079175 | A1 * | 3/2018 | Ontiveros Balcazar | |
| | | | | C23C 22/76 |
| 2018/0331537 | A1 * | 11/2018 | Watanabe | H02J 3/32 |
| 2019/0393723 | A1 * | 12/2019 | Pavlovski | H02J 3/12 |
| 2022/0181903 | A1 * | 6/2022 | Luo | H02J 7/00032 |
| 2022/0413944 | A1 * | 12/2022 | Lemoine | G06F 9/5077 |

FOREIGN PATENT DOCUMENTS

| | | | | | | |
|---|---|---|---|---|---|---|
| CN | 103647296 | A | | 3/2014 | | |
| CN | 103986174 | A | | 8/2014 | | |
| CN | 103117564 | B | * | 12/2014 | | |
| CN | 104242322 | A | | 12/2014 | | |
| CN | 104362521 | A | * | 2/2015 | | H02B 1/26 |
| CN | 105449822 | A | * | 3/2016 | | H02J 7/35 |
| CN | 105676997 | A | | 6/2016 | | |
| CN | 105870961 | A | | 8/2016 | | |
| CN | 106100036 | A | | 11/2016 | | |
| CN | 106549489 | A | | 3/2017 | | |
| CN | 106816883 | A | | 6/2017 | | |
| CN | 107086591 | A | | 8/2017 | | |
| CN | 108281974 | A | | 7/2018 | | |
| CN | 108599154 | A | | 9/2018 | | |
| CN | 109256836 | A | * | 1/2019 | | H02J 7/0063 |
| CN | 109873452 | A | | 6/2019 | | |
| CN | 110854916 | A | | 2/2020 | | |
| CN | 111510001 | A | | 8/2020 | | |
| JP | H1070844 | A | | 3/1998 | | |
| WO | 2016159748 | A1 | | 10/2016 | | |

OTHER PUBLICATIONS

International Search Report and Written Opinion in International Appln. No. PCT/CN2021/095664, mailed on Jul. 15, 2021, 15 pages (with English translation).

Ross et al., "Development of a battery runtime prediction algorithm and a method for determining its accuracy," Proceedings of INTELEC 95. 17th International Telecommunications Energy Conference, Aug. 6, 2002, 7 pages.

Extended European Search Report in European Appln No. 21812376. 8, dated Dec. 15, 2023, 9 pages.

* cited by examiner

ELECTRIC ENERGY CONTROL METHOD AND RELATED DEVICE

CROSS-REFERENCE TO RELATED APPLICATIONS

This application is a continuation of International Application No. PCT/CN2021/095664, filed on May 25, 2021, which claims priority to Chinese Patent Application No. 202010460832.7, filed on May 27, 2020. The disclosures of the aforementioned applications are hereby incorporated by reference in their entireties.

TECHNICAL FIELD

Embodiments of this application relate to the communication field, and in particular, to an electric energy control method and a related device.

BACKGROUND

A base station is a form of a radio station, and refers to a radio transceiver station that exchanges information with a mobile phone terminal in a specific radio coverage area by using a mobile communication switching center. With development of wireless communication technologies from 2G, 3G, and 4G to 5G, network communication standards are continuously evolved, and a requirement on a bearer capability of a base station in a communication network is increasingly high.

In a conventional technology, a base station may enhance its bearer capability by using wireless coverage of multi-mode networking. For example, a single site supports multi-band and multi-mode access, or even a plurality of different operators share a same site. The base station needs to implement multi-mode networking by adding apparatuses such as a transceiver (TRX) and a power amplifier (PA).

However, due to an increase in a quantity of power-consuming apparatuses such as the TRX and the PA in the base station, electric energy consumed by the base station is greatly increased, causing an original power supply capacity of a communication site to be insufficient.

SUMMARY

A first aspect of embodiments of this application provides an electric energy control method, including:

adding an energy storage device. When power of a main device is lower than baseline power, that is, the baseline power output by a power supply device still has a remainder after provided for use by the main device, the energy storage device is in a charged state and stores the remaining electric energy. When the power of the main device is greater than the baseline power, that is, the baseline power output by the power supply device is insufficient to be provided for use by the main device, the main device receives electric energy output by the power supply device and the energy storage device, that is, the energy storage device is in a discharging state and supplies power together with the power supply device to ensure operation of the main device. However, an amount of electric energy stored in the energy storage device is limited. If the power of the main device is in a relatively high state for a long time, when the amount of electric energy of the energy storage device is insufficient, the main device decreases the power of the main device. The power of the main device may be radio frequency power of a preset frequency band of the main device. In embodiments of this application, the power of the main device is power consumed during operation of the main device, the baseline power is power output by the power supply device, and the main device may include a base station device.

In embodiments of this application, an electric energy control method of adding an energy storage device is provided. When the power of the main device is higher than the baseline power, the energy storage device performs discharge to supply electric energy to the main device. When the power of the main device is higher than the baseline power and the amount of electric energy of the energy storage device is insufficient, the main device decreases the power of the main device, to reduce site breakdowns caused by excessively high power of the main device.

Based on the first aspect of embodiments of this application, in a first implementation of the first aspect of embodiments of this application, a criterion for determining whether the amount of electric energy of the energy storage device is sufficient may be remaining discharge time, that is, when the remaining discharge time is less than preset time, the main device decreases the power of the main device. A manner of calculating the remaining discharge time may be:

Remaining discharge time=Electric energy stored in the energy storage device/(Power of the main device–Baseline power).

Embodiments of this application provide a criterion for determining whether an amount of electric energy of an energy storage device is sufficient.

Based on the first aspect of embodiments of this application or the first implementation of the first aspect, in a second implementation of the first aspect of embodiments of this application, before the main device decreases the power of the main device, the main device may receive an energy saving signal. The signal energy saving signal indicates the main device to decrease the power of the main device to no higher than the baseline power.

In embodiments of this application, the main device may determine, based on the energy saving signal, that the amount of electric energy of the energy storage device is insufficient, that is, the energy saving signal indicates the main device to decrease the power of the main device to no higher than the baseline power.

A second aspect of embodiments of this application provides an electric energy control method, including:

adding an energy storage device. When power of a main device is lower than baseline power, that is, the baseline power output by a power supply device still has a remainder after provided for use by the main device, the energy storage device is in a charged state and stores the remaining electric energy. When the power of the main device is greater than the baseline power, that is, the baseline power output by the power supply device is insufficient to be provided for use by the main device, the main device receives electric energy output by the power supply device and the energy storage device, that is, the energy storage device is in a discharging state and supplies power together with the power supply device to ensure operation of the main device. However, an amount of electric energy stored in the energy storage device is limited. If the power of the main device is in a relatively high state for a long time, when the amount of electric energy of the energy storage device is insufficient, the power supply device indicates the main device to decrease the power of the main device. In embodiments of this application, the power of the main device is power consumed during operation of the main device, the baseline power is power output by the power supply device, and the main device may include a base station device.

In embodiments of this application, an electric energy control method of adding an energy storage device is provided. When the power of the main device is higher than the baseline power, the energy storage device performs discharge to supply electric energy to the main device. When the power of the main device is higher than the baseline power and the amount of electric energy of the energy storage device is insufficient, the power supply device indicates the main device to decrease the power of the main device, to reduce operation failures caused by excessively high power of the main device.

Based on the second aspect of embodiments of this application, in a first implementation of the second aspect of embodiments of this application, a criterion for determining whether the amount of electric energy of the energy storage device is sufficient may be remaining discharge time, that is, when the remaining discharge time is less than preset time, the main device decreases the power of the main device. A manner of calculating the remaining discharge time may be:

Remaining discharge time=Electric energy stored in the energy storage device/(Power of the main device−Baseline power).

Embodiments of this application provide a criterion for determining whether an amount of electric energy of an energy storage device is sufficient.

Based on the second aspect of embodiments of this application or the first implementation of the second aspect, in a second implementation of the second aspect of embodiments of this application, when the amount of electric energy of the energy storage device is insufficient, the power supply device may send an energy saving signal to the main device. The signal energy saving signal indicates the main device to decrease the power of the main device to no higher than the baseline power.

A third aspect of embodiments of this application provides a main device. The device performs the method in the first aspect and the implementations of the first aspect.

A fourth aspect of embodiments of this application provides an energy storage device. The device performs the method in the second aspect and the implementations of the second aspect.

A fifth aspect of embodiments of this application provides a computer storage medium. The computer storage medium stores instructions. When the instructions are executed on a computer, the computer is enabled to perform the method in the first aspect and the implementations of the first aspect, or the second aspect and the implementations of the second aspect.

A sixth aspect of embodiments of this application provides a computer software product. When the computer program product is executed on a computer, the computer is enabled to perform the method in the first aspect and the implementations of the first aspect, or the second aspect and the implementations of the second aspect.

DESCRIPTION OF EMBODIMENTS

Figure 1:
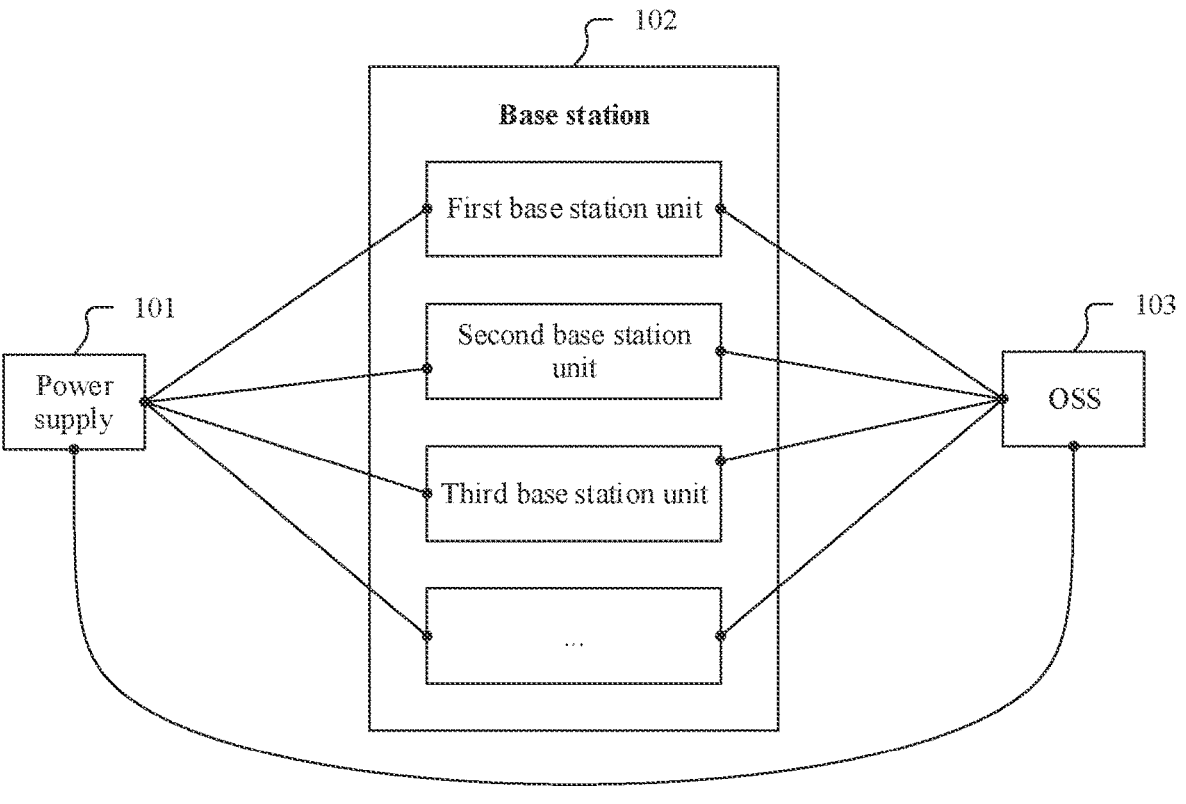
FIG. 1 is a schematic diagram of an application scenario according to an embodiment of this application.

Technical solutions provided in embodiments of this application may be applied to various communication systems, for example, a long term evolution (LTE) system, a fifth generation (5G) mobile communication system, wireless-fidelity (Wi-Fi) system, a future communication system, or a system that integrates a plurality of communication systems. This is not limited in embodiments of this application. 5G may also be referred to as new radio (NR).

A main device may be a base station, or may be another network device. Currently, examples of some network devices are: a next-generation nodeB (gNB), a transmission reception point (TRP), an evolved nodeB (eNB), a radio network controller (RNC), a nodeB (NB), a base station controller (BSC), a base transceiver station (BTS), a home base station (for example, home evolved NodeB, or home NodeB, HNB), a baseband unit (BBU), a wireless fidelity (Wi-Fi) access point (AP), or the like.

An energy storage device may be a battery device, for example, a lithium battery or a chemical battery. This is not limited herein.

A power supply device may be an intelligent peak clipping power supply including one or more of a site monitoring unit (SMU), a current detection module, and a rectifier device.

With development of wireless communication technologies from 2G, 3G, and 4G to 5G, network communication standards are continuously evolved, and a requirement on a bearer capability of a base station in a communication network is increasingly high. In a conventional technology, a base station may enhance its bearer capability by using wireless coverage of multi-mode networking. For example, a single site supports multi-band and multi-mode access, or even a plurality of different operators share a same site. Multi-band means that a same base station supports wireless communication of at least two single frequency bands defined in 3GPP. Multi-mode means that a same base station supports wireless communication of at least two of a 2G network standard, a 3G network standard, a 4G network standard, and a 5G network standard. The base station needs to implement multi-mode networking by adding apparatuses such as a TRX and a PA. However, due to an increase in a quantity of power-consuming apparatuses such as the TRX channel and the PA in the base station, electric energy consumed by the base station is greatly increased. In an existing base station architecture, a base station may be directly connected to a power supply. In an existing energy saving solution, field operation personnel reduce power consumption by controlling the base station to be powered off, that is, the field operation personnel may use the power supply to control the base station to be powered off to reduce consumption of electric energy. It is clear that, this energy saving manner has a disadvantage, that is, all energy storage devices connected to the base station are disconnected due to power-off of the base station, leading to poor user experience of terminals. In embodiments of this application, the existing base station architecture is improved and optimized to resolve the foregoing problem.

Referring to FIG. 1, an embodiment of this application provides a distributed base station system (DBS), including a power supply 101, a base station 102, and an operations support system (OSS) 103. The base station 102 may generally include a remote radio unit (RRU), an active antenna unit (AAU), a baseband unit (BBU), and a distributed unit (DU), central unit (CU), and the like. The base station 102 may be divided into base station units based on different frequency bands. RRUs, AAUs, BBUs, DUs, and CUs corresponding to different frequency bands in the base station 102 may form different base station units, which may include a first base station unit, a second base station unit, a third base station unit, and the like. For example, different network standards generally correspond to different frequency bands, and the base station may be divided into units based on different network standards. The first base station unit may include a part (with frequency bands 1880 MHz to 1900 MHz and 2010 MHz to 2025 MHz) that supports communication in a 3G network standard in the base station, the second base station unit may include a part (with frequency bands 1880 MHz to 1900 MHz, 2320 MHz to 2370 MHz, and 2575 MHz to 2635 MHz) that supports communication in a 4G network standard in the base station, and the third base station unit may include a part (with frequency bands 3300 MHz to 3400 MHz, 3400 MHz to 3600 MHz, and 4800 MHz to 5000 MHz) that supports communication in a 5G network standard in the base station. Alternatively, the base station may be divided into units based on different frequency bands in a same network standard. The first base station unit may include a part (with a frequency band 1880 MHz to 1900 MHz) that supports communication in the 4G network standard in the base station, the second base station unit may include a part (with a frequency band 2320 MHz to 2370 MHz) that supports communication in the 4G network standard in the base station, and the third base station unit may include a part (with a frequency band 2575 MHz to 2635 MHz) that supports communication in the 4G network standard in the base station. Alternatively, the base station may be divided in different network standards to obtain base station units of different frequency bands. In addition, in an implementation process, different base station units may be formed by combining different architectures. The first base station unit is used as an example. The first base station unit may include a combination of an RRU and a BBU that correspond to any frequency band in the 4G network standard, a combination of an RRU, an AAU, and a BBU that correspond to any frequency band in the 4G network standard, or a combination of an AAU, a DU, and a CU that correspond to any frequency band in the 5G network standard, or may be another combination in another network standard. This is not limited herein. In this embodiment and subsequent embodiments, description is provided by using only an example in which different base station units include combinations of RRUs and BBUs corresponding to different frequency bands in the 4G network standard. In addition, the OSS 103 may be integrated onto the power supply 101, or may be integrated onto the base station 102, or may be disposed independently from the power supply 101 and the base station 102. This is not limited herein.

Figure 2:
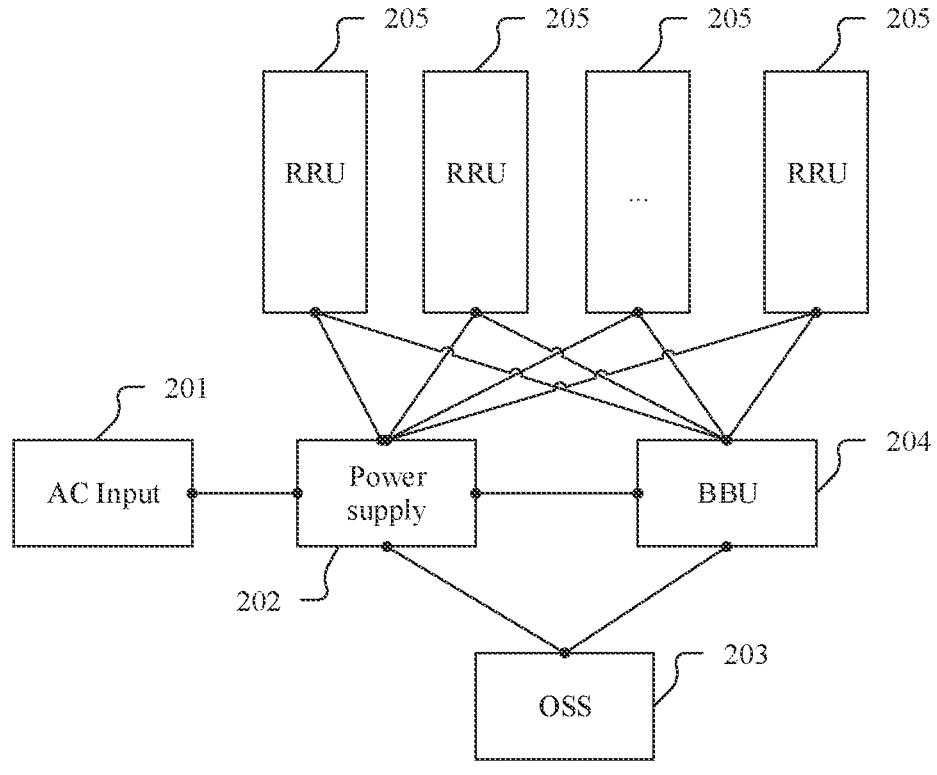
FIG. 2 is a schematic diagram of a distributed base station system according to an embodiment of this application.

Based on the DBS architecture in FIG. 1, FIG. 2 shows a specific embodiment of a DBS in a specific implementation process according to an embodiment of this application. During operation of the DBS, an alternating current (AC) input 201 may be specifically used to supply original power to a power supply 202. Then, power is supplied to a BBU 204 and an RRU 205 in a base station, which may include a first base station unit, a second base station unit, a third base station unit, and the like. In addition, an operations support system OSS 203 is separately connected to the power supply 202, and the BBU 204 and the RRU 205 in the base station. It is clear that, in this embodiment and subsequent embodiments, the AC input 201 is merely an example, and power may alternatively be supplied to the power supply 202 by a direct current input or another power input. This is not limited herein.

Figure 3:
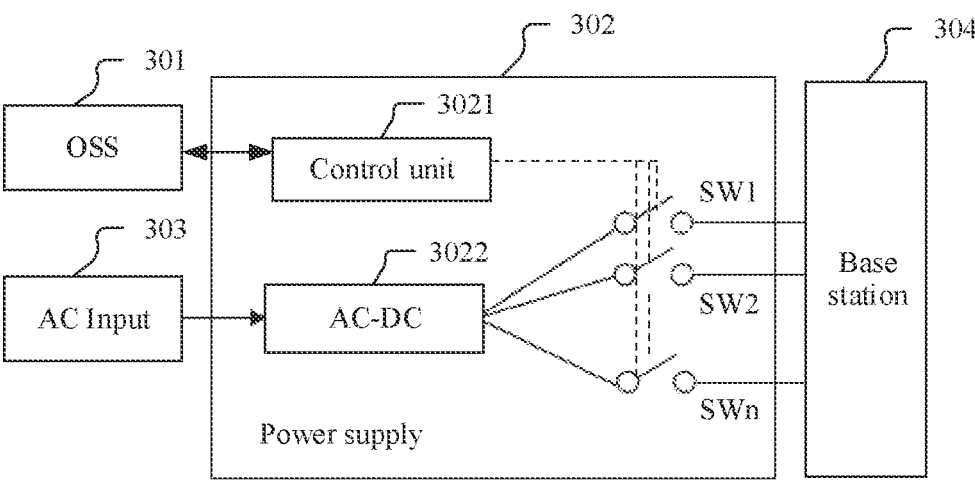
FIG. 3 is another schematic diagram of a distributed base station system according to an embodiment of this application.

Based on the embodiment of the DBS provided in FIG. 2, further extension may be implemented inside the power supply 202. Referring to FIG. 3, the DBS includes an OSS 301, a power supply 302, an AC input 303, and a base station 304. For example, in an implementation process, the power supply 302 may include a control unit 3021 interconnected with the OSS 301, and at least one AC-direct current (DC) 3022 connected to the AC input 303. The control unit 3021 may use at least one switch (SW) to control a power supply status of the AC-DC 3022 supplying power to the base station. In addition, the SW may be configured by the control unit by using hardware or software. This is not limited herein.

With reference to the network architectures shown in FIG. 1 to FIG. 3, an electric energy control method in an embodiment of this application includes steps 401 to 406.

401. A main device establishes a connection to a power supply device.

The main device establishes a connection to the power supply device. The connection may be a wired connection or a wireless connection. This is not specifically limited herein.

402. The power supply device determines power of the main device and baseline power. When the power of the main device is greater than the baseline power, step 403 is performed. When the power of the main device is less than the baseline power, step 404 is performed.

In this embodiment of this application, the power of the main device is power consumed during operation of the main device. For example, the power of the main device is radio frequency power of a preset frequency band of the main device. The baseline power is power output by the power supply device. In a city, the baseline power may be maximum output power that can be used by the power supply device and that remains after alternating current device power (such as air conditioner power) is subtracted from maximum output power of a mains supply.

403. The power supply device determines remaining discharge time. When the remaining discharge time is not less than preset time, step 405 is performed. When the remaining discharge time is less than the preset time, step 406 is performed.

In this embodiment of this application, a manner of calculating the remaining discharge time may be:

$$\text{Remaining discharge time} = \text{Electric energy stored in an energy storage device} / (\text{Power of the main device} - \text{Baseline power}).$$

That is, the remaining discharge time is obtained by dividing current remaining electric energy of the energy storage device by a difference between current power of the main device and the baseline power.

The preset time is generally 10 minutes, and specific duration is not limited. For example, the preset time is 8 minutes.

In this embodiment of this application, the remaining discharge time in step 403 is only a determining criterion for determining whether an amount of electric energy stored in the energy storage device is sufficient. It may be understood that another determining criterion may alternatively be used. For example, when the amount of electric energy stored in the energy storage device is not lower than an electric energy threshold, step 405 is performed. When the amount of electric energy stored in the energy storage device is lower than the electric energy threshold, step 406 is performed.

404. The energy storage device receives electric energy output by the power supply device.

When the power of the main device is less than the baseline power, the power output by the power supply device is higher than the power consumed during operation of the main device, and the energy storage device may be in a charged state and receive electric energy output by the power supply device. Received power may be the baseline power minus the power of the main device.

405. The main device receives electric energy output by the energy storage device and the power supply device.

When the power of the main device is higher than the baseline power, the baseline power is insufficient to ensure power required by the main device. In this case, the energy storage device may be in a discharging state, and supply power to the main device.

406. The power supply device indicates the main device to decrease the power of the main device.

When the amount of electric energy stored in the energy storage device is insufficient, the power supply device indicates the main device to decrease the power of the main device, to reduce site breakdowns caused by excessively high power of the main device. A specific indication manner may be as follows: The main device receives an energy saving signal from the power supply device. The energy saving signal is used to indicate the main device to decrease the power of the main device.

Figure 5:
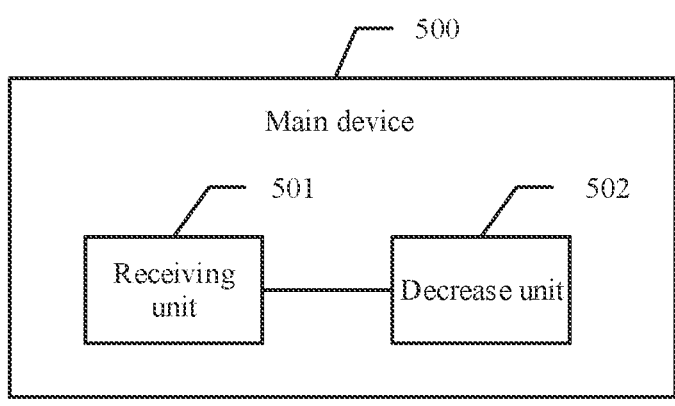
FIG. 5 is a schematic diagram of a structure of a main device according to an embodiment of this application.

The foregoing describes the electric energy control method in embodiments of this application. The following describes a device in embodiments of this application. Referring to FIG. 5, an embodiment of a main device 500 in embodiments of this application includes:

a receiving unit 501, configured to receive electric energy output by a power supply device and an energy storage device, and further configured to receive an energy saving signal, where the energy saving signal indicates the main device to decrease power of the main device to no higher than baseline power; and a decrease unit 502, configured to decrease the power of the main device when electric energy stored in the energy storage device is lower than an electric energy threshold, and specifically configured to decrease the power of the main device when remaining discharge time is less than preset time.

Figure 4:
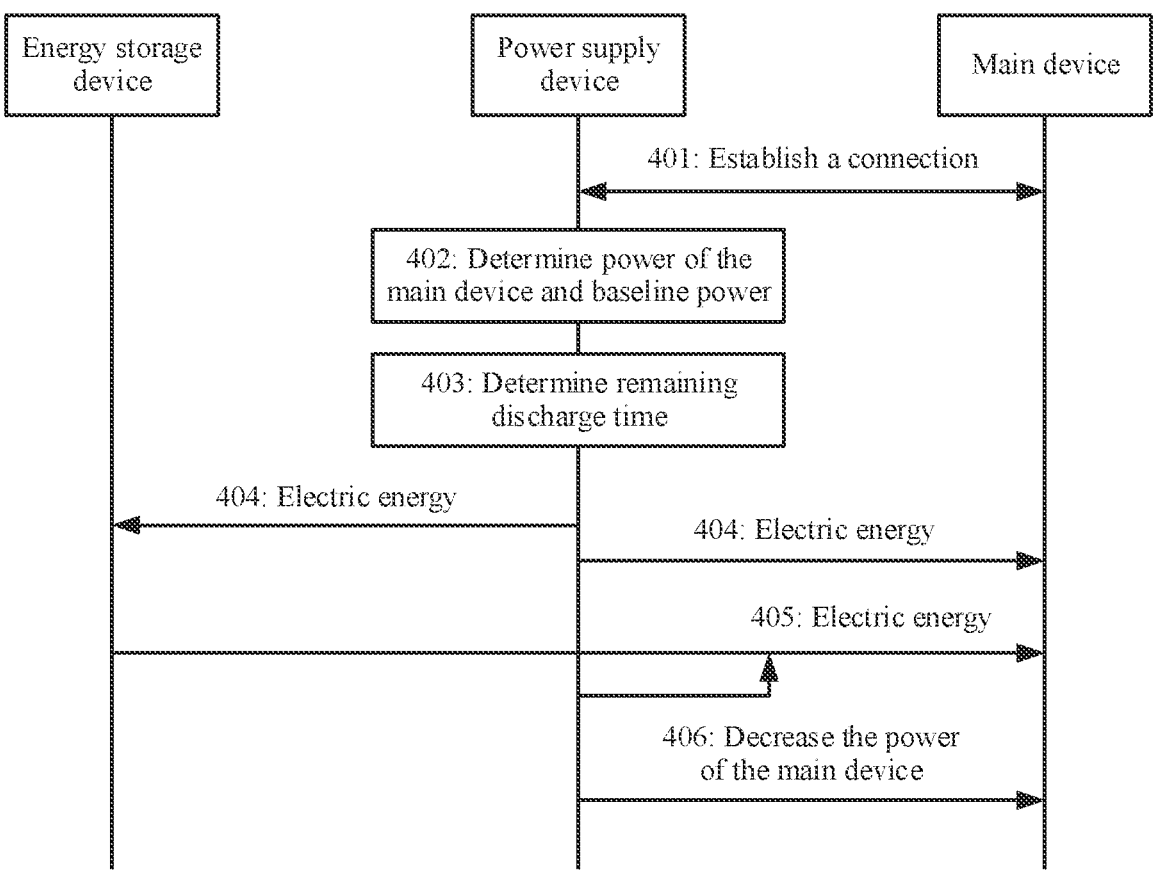
FIG. 4 is a schematic flowchart of an electric energy control method according to an embodiment of this application.

In this embodiment, operations performed by the units in the main device are similar to those described in the embodiment shown in FIG. 4, and details are not described herein again.

Figure 6:
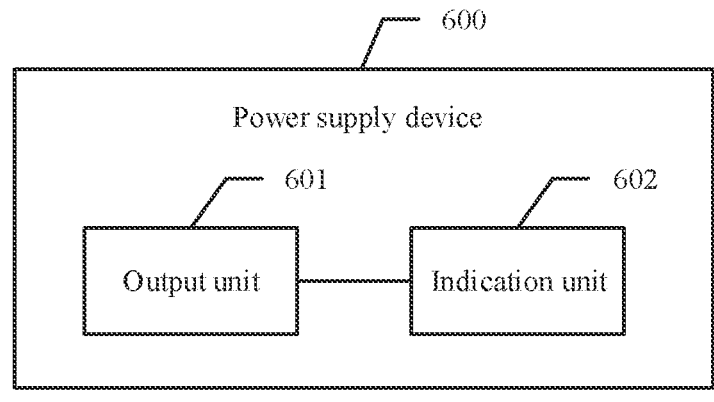
FIG. 6 is a schematic diagram of a structure of a power supply device according to an embodiment of this application.

Referring to FIG. 6, an embodiment of a power supply device 600 in embodiments of this application includes:

an output unit 601, configured to output electric energy to an energy storage device and a main device when power of the main device is less than baseline power, and further configured to output electric energy to the main device when the power of the main device is greater than the baseline power; and an indication unit 602, configured to indicate the main device to decrease the power of the main device when electric energy stored in an energy storage device is lower than an electric energy threshold, specifically configured to decrease the power of the main device when remaining discharge time is less than preset time, and specifically configured to send an energy saving signal to the main device.

In this embodiment, operations performed by the units in the power supply device are similar to those described in the embodiment shown in FIG. 4, and details are not described herein again.

Figure 7:
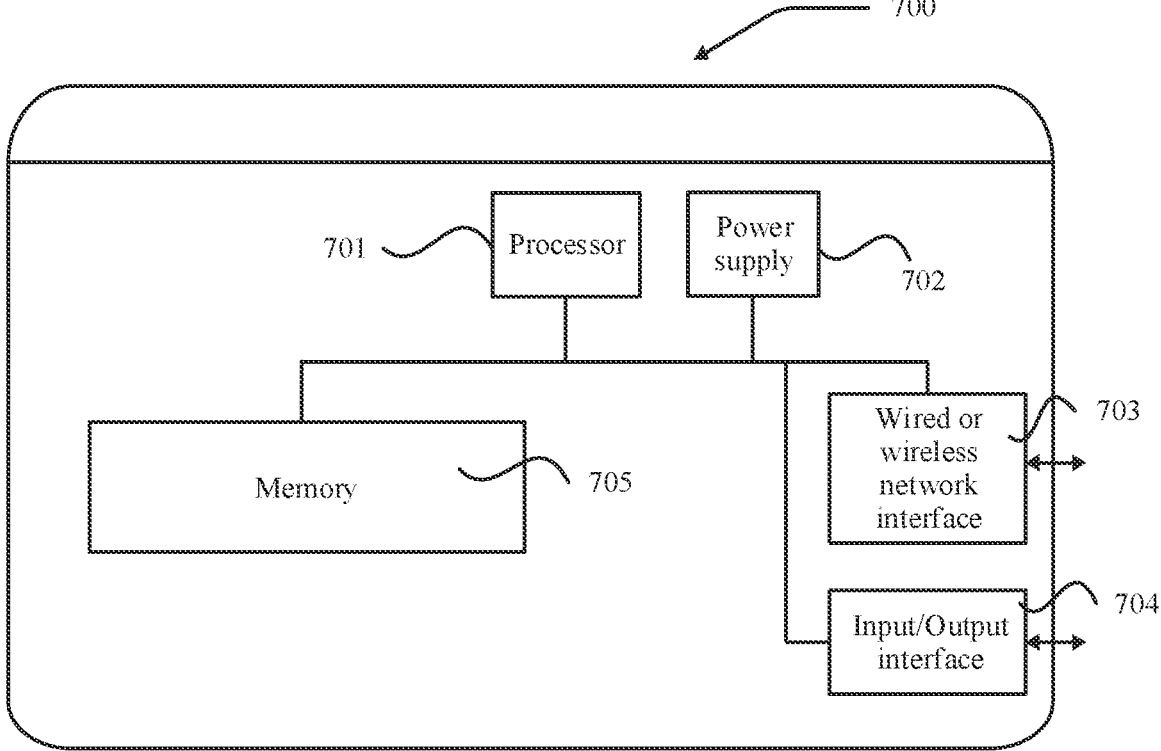
FIG. 7 is a schematic diagram of another structure of a main device according to an embodiment of this application.

FIG. 7 is a schematic diagram of a structure of a main device according to an embodiment of this application. The main device 700 may include one or more processors 701 and a memory 705. The memory 705 stores one or more application programs or data.

The memory 705 may be a volatile memory or a persistent memory. The program stored in the memory 705 may include one or more modules, and each module may include a series of instruction operations on the main device. Furthermore, the processor 701 may be configured to communicate with the memory 705, and perform, on the main device 700, a series of instruction operations in the memory 705.

The main device 700 may further include one or more power supplies 702, one or more wired or wireless network interfaces 703, one or more input/output interfaces 704, and/or one or more operating systems, for example, any one of a Microsoft system (Windows), an Android system (Android), an Apple operating system (Mac OS), Unix, and Linux.

The processor 701 may perform operations performed by the main device in the embodiment shown in FIG. 4. Details are not described herein again.

Figure 8:
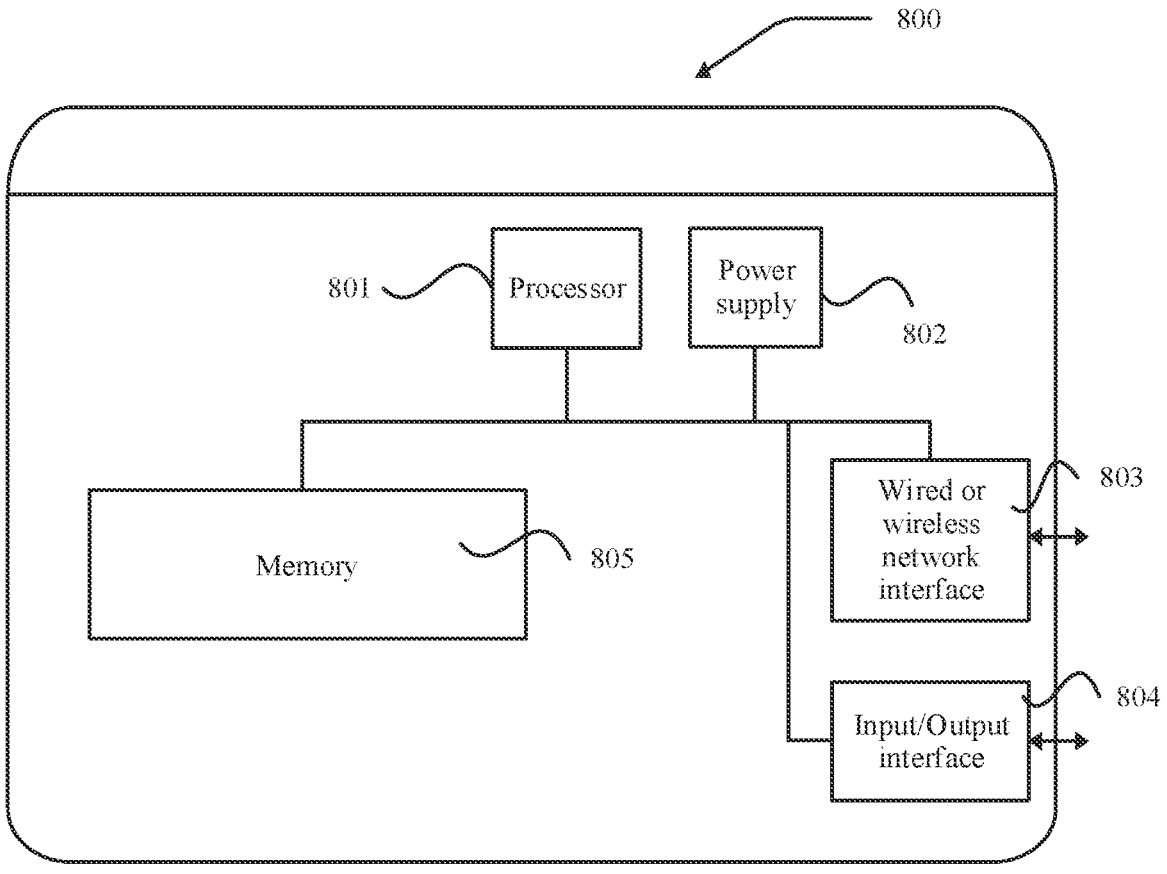
FIG. 8 is a schematic diagram of another structure of a power supply device according to an embodiment of this application.

FIG. 8 is a schematic diagram of a structure of a power supply device according to an embodiment of this application. The power supply device 800 may include one or more processors 801 and a memory 805. The memory 805 stores one or more application programs or data.

The memory 805 may be a volatile memory or a persistent memory. The program stored in the memory 805 may include one or more modules, and each module may include a series of instruction operations on the power supply device. Furthermore, the processor 801 may be configured to communicate with the memory 805, and perform, on the power supply device 800, a series of instruction operations in the memory 805.

The power supply device 800 may further include one or more power supplies 802, one or more wired or wireless network interfaces 803, one or more input/output interfaces 804, and/or one or more operating systems, for example, any one of a Microsoft system (Windows), an Android system (Android), an Apple operating system (Mac OS), Unix, and Linux.

The processor 801 may perform operations performed by the power supply device in the embodiment shown in FIG. 4. Details are not described herein again.

This application provides a power supply device. The power supply device is coupled to a memory, and is configured to read and execute instructions stored in the memory, to enable the power supply device to implement steps of the method performed by the power supply device in FIG. 4. In a possible design, the power supply device is a chip or a system on chip.

This application provides a main device. The main device is coupled to a memory, and is configured to read and execute instructions stored in the memory, to enable the main device to implement steps of the method performed by the main device in FIG. 4. In a possible design, the main device is a chip or a system on chip.

This application provides a chip system. The chip system includes a processor, configured to support a main device or a power supply device in implementing functions in the foregoing aspects, for example, send or process data and/or information in the foregoing method. In a possible design, the chip system further includes a memory. The memory is configured to store program instructions and data that are necessary for the network device. The chip system may include a chip, or may include a chip and another discrete device.

In another possible design, when the chip system is a chip in the main device, the power supply device, or the like, the chip includes a processing unit and a communication unit. The processing unit may be, for example, a processor, and the communication unit may be, for example, an input/output interface, a pin, or a circuit. The processing unit may execute computer execution instructions stored in a storage unit, to enable the chip in the main device, the power supply device, or the like to perform steps of the method performed by the main device or the power supply device in the embodiment shown in FIG. 4. Optionally, the storage unit is a storage unit in the chip, such as a register or a buffer, or the storage unit may be a storage unit in the main device, the power supply device, or the like but outside the chip, such as a read-only memory (ROM), another type of static storage device capable of storing static information and instructions, or a random access memory (RAM).

An embodiment of this application further provides a processor, configured to be coupled to a memory, and configured to perform a method and a function that are related to the main device in any one of the foregoing embodiments.

An embodiment of this application further provides a processor, configured to be coupled to a memory, and configured to perform a method and a function that are related to the power supply device in any one of the foregoing embodiments.

An embodiment of this application further provides a computer-readable storage medium, storing a computer program. When the computer program is executed by a computer, a method procedure related to the main device or the power supply device in any one of the foregoing method embodiments is implemented. Correspondingly, the computer may be the main device or the power supply device.

It should be understood that, the processor mentioned in the main device, the power supply device, the chip system, or the like in embodiments of this application may be a central processing unit (CPU), or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It should be further understood that, in the foregoing embodiments of this application, there may be one or more processors in the main device, the power supply device, the chip system, or the like, which may be adjusted based on an actual application scenario. This is merely an example for description, and does not constitute a limitation herein. In embodiments of this application, there may be one or more memories, which may be adjusted based on an actual application scenario. This is merely an example for description, and does not constitute a limitation herein.

It should be further understood that, in embodiments of this application, the memory or readable storage medium mentioned in the main device, the power supply device, the chip system, or the like in the foregoing embodiments may be a volatile memory or a non-volatile memory, or may include both a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) and is used as an external cache. By way of example and not limitation, RAMs in many forms may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be further noted that when the main device or the power supply device includes a processor (or a processing unit) and a memory, the processor in this application may be integrated with the memory, or the processor and the memory may be connected by using an interface. This may be adjusted based on an actual application scenario, and is not limited.

An embodiment of this application further provides a computer program or a computer program product including a computer program. When the computer program is executed on a computer, the computer is enabled to implement a method procedure of the main device or the power supply device in any one of the foregoing method embodiments. Correspondingly, the computer may be the main device or the power supply device.

All or some of the foregoing embodiments in FIG. 4 may be implemented by using software, hardware, firmware, or any combination thereof. When software is used to implement the embodiments, all or a part of the embodiments may be implemented in a form of a computer program product.

The computer program product includes one or more computer instructions. When the computer program instructions are loaded and executed on the computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid-State Drive (SSD)), or the like.

It may be clearly understood by a person skilled in the art that, for the purpose of convenient and brief description, for a detailed working process of the foregoing system, apparatus, and unit, refer to a corresponding process in the foregoing method embodiment. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to a conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments shown in FIG. 4 of this application. The storage medium includes any medium that can store program code, such as a USB flash drive, a removable hard disk, a read-only memory (ROM), a random access memory (RAM), a magnetic disk, or an optical disc.

In the specification, claims, and accompanying drawings of this application, the terms "first", "second", and so on are intended to distinguish between similar objects but do not necessarily indicate a specific order or sequence. It should be understood that the terms used in such a way are interchangeable in proper circumstances, and this is merely a discrimination manner for describing objects having a same attribute in embodiments of this application. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

Names of the message/frame/information, the module, the unit, and the like provided in embodiments of this application are merely examples, and other names may be used provided that the message/frame/information, the module, the unit, and the like have same functions.

The terms used in embodiments of this application are merely for the purpose of illustrating specific embodiments, and are not intended to limit the present invention. The terms "a", "said" and "the" of singular forms used in embodiments and the appended claims of this application are also intended to include plural forms, unless otherwise specified in the context clearly. It should be further understood that, in the description of this application, unless otherwise indicated, "/" represents an "OR" relationship between associated objects. For example, A/B may represent A or B. In this application, "and/or" is merely an association relationship describing an associated object, and represents that three relationships may exist. For example, A and/or B may represent three cases: only A exists, both A and B exist, and only B exists. A or B may be singular or plural.

Depending on the context, for example, words "if" used herein may be explained as "while" or "when" or "in response to determining" or "in response to detection". Similarly, depending on the context, phrases "if determining" or "if detecting (a stated condition or event)" may be explained as "when determining" or "in response to determining" or "when detecting (the stated condition or event)" or "in response to detecting (the stated condition or event)".

In conclusion, the foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A method, wherein, when power of a main device is greater than a baseline power, the method comprises:
  receiving, by the main device, electric energy output by a power supply device and an energy storage device;
  decreasing, by the main device, power of the main device when a remaining discharge time duration of the energy storage device is less than a preset time duration, wherein the power of the main device is power consumed during operation of the main device, and the baseline power is power output by the power supply device.

2. The method according to claim 1, wherein the remaining discharge time duration is calculated in the following manner:

$$\text{Remaining discharge time duration} = \text{Electric energy stored in the energy storage device}/(\text{Power of the main device} - \text{Baseline power}).$$

3. The method according to claim 1, wherein before the main device decreases the power of the main device, the method further comprises:

receiving, by the main device, an energy saving signal from the power supply device, wherein the energy saving signal indicates the main device to decrease the power of the main device to be not greater than the baseline power.

4. The method of claim 1, wherein when the power of the main device is greater than the baseline power, the baseline power is insufficient to ensure power required by the main device.

5. A method, wherein:

when power of a main device is lower than baseline power, outputting, by a power supply device, electric energy to an energy storage device and the main device, wherein the power of the main device is power consumed during operation of the main device, and the baseline power is power output by the power supply device;

outputting, by the power supply device, electric energy to the main device when the power of the main device is greater than the baseline power; and when a remaining discharge time duration of the energy storage device is less than a preset time duration, decreasing, by the main device as indicated by the power supply device, the power of the main device.

6. The method according to claim 5, wherein the remaining discharge time duration is calculated in the following manner:

$$\text{Remaining discharge time duration} = \text{Electric energy stored in the energy storage device}/(\text{Power of the main device} - \text{Baseline power}).$$

7. The method according to claim 5, wherein the decreasing, by the main device as indicated by the power supply device, the power of the main device comprises:

sending, by the power supply device to the main device, an energy saving signal, wherein the energy saving signal indicates to the main device to decrease the power of the main device to be not greater than the baseline power.

8. The method according to claim 5, wherein when the power of the main device is greater than the baseline power, the baseline power is insufficient to ensure power required by the main device.

9. A main device, comprising at least one processor, a memory, and an interface, wherein, when power of the main device is greater than baseline power:

the processor is configured to utilize the interface to receive electric energy output by a power supply device and an energy storage device; and the processor is configured to decrease power of the main device when a remaining discharge time duration of the energy storage device is less than a preset time duration, wherein the power of the main device is power consumed during operation of the main device, and the baseline power is power output by the power supply device.

10. The main device according to claim 9, wherein the remaining discharge time duration is calculated in the following manner:

$$\text{Remaining discharge time duration} = \text{Electric energy stored in the energy storage device}/(\text{Power of the main device} - \text{Baseline power}).$$

11. The main device according to claim 9, wherein the processor is configured to utilize the interface to receive an energy saving signal from a power supply device, wherein the energy saving signal indicates to the main device to decrease the power of the main device to be not greater than the baseline power.

12. The main device according to claim 9, wherein when the power of the main device is greater than the baseline power, the baseline power is insufficient to ensure power required by the main device.

* * * * *